Sept. 8, 1931.  W. B. JUPP  1,822,150
EXCITER DIFFERENTIAL FIELD CONTROL
Filed June 13, 1929
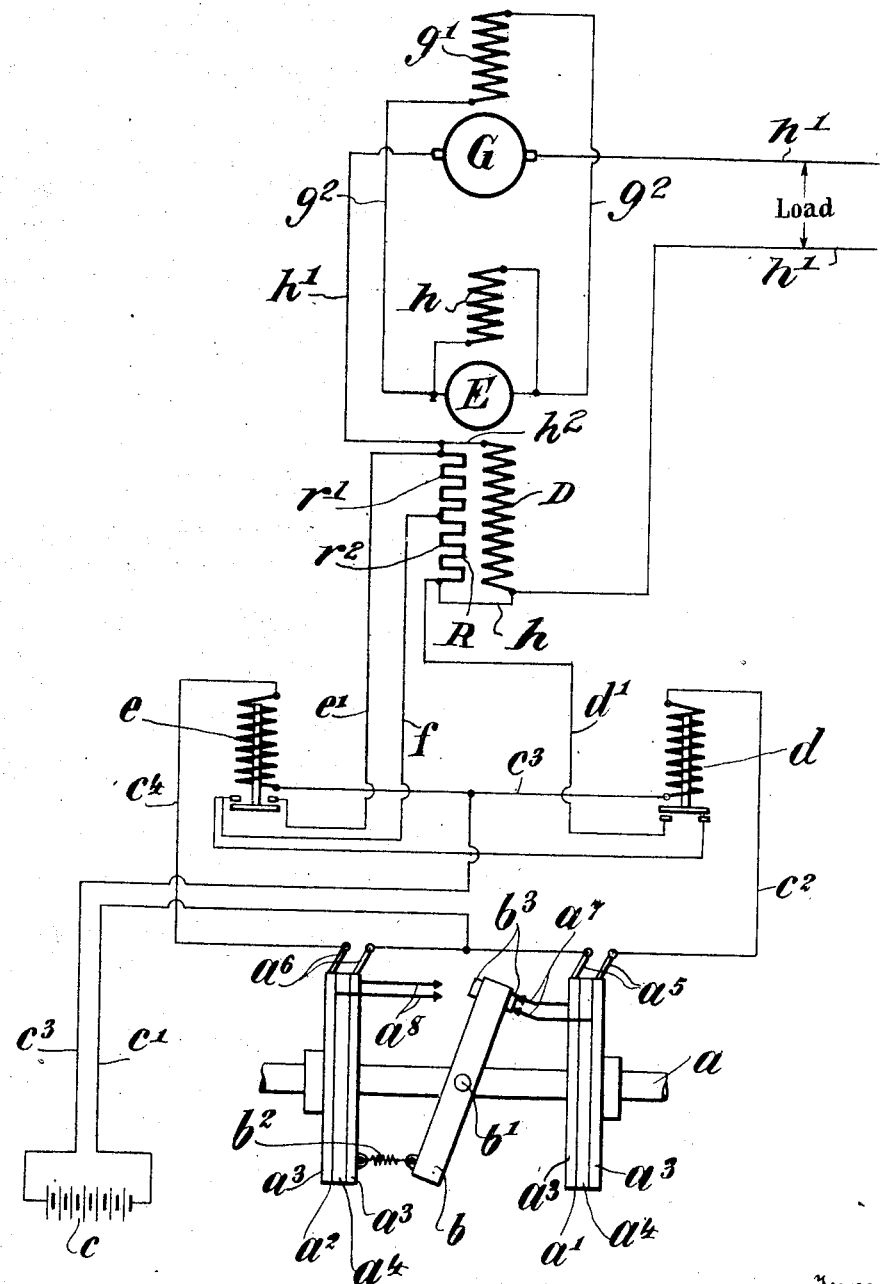
Inventor:
William B. Jupp,
By his attorneys:
Redding, Greeley, O'Shea & Campbell Patented Sept. 8, 1931

1,822,150

UNITED STATES PATENT OFFICE

WILLIAM B. JUPP, OF NEW YORK, N. Y., ASSIGNOR TO INTERNATIONAL MOTOR COMPANY, OF NEW YORK, N. Y., A CORPORATION OF DELAWARE

EXCITER DIFFERENTIAL FIELD CONTROL

Application filed June 13, 1929. Serial No. 370,492.

The present invention relates to a field controlling mechanism for a generator and embodies, more specifically, an improved device for controlling the field of a generator in accordance with the load characteristics of a unit for which the generator supplies power.

Although the invention is applicable to many types of installations, it has been designed, and will be described as embodied in a gasoline electric power unit adapted for use particularly upon vehicles. In such power units, an internal combustion engine drives a generator which supplies power to driving motors. Best operation is had when the generator is separately excited and, therefore, an exciter is provided having a differentially compounded field. The series field of the exciter is connected in series with the main generator in order that the generator load may exert a proper effect upon the excitation of the exciter field.

In the above described hook-up of units, as the generator output increases, the strength of the exciter differential field increases, thus weakening the exciter field and reducing its voltage. This reduces the excitation of the main generator field and thus also reduces the output of the generator and the load on the internal combustion engine.

When the generator is cold, as in starting up, it frequently happens that the engine hasn't sufficient power to cause the generator to supply sufficient current to the differential field to produce the desired weakening effect in order that the generator load may be reduced to permit the engine to build up. Under these conditions, satisfactory operation is not had and the present invention is designed to overcome these difficulties.

An object of the invention therefore is to provide a means for permitting the load of the generator to be decreased automatically, thus enabling the engine to build up.

A further object of the invention is to provide a means for reducing the exciter output and to decrease the generator load in accordance with the building up of the engine.

A further object of the invention is to provide a means for controlling the field strength of the exciter in acocrdance with the speed of the internal combustion engine.

A further object of the invention is to provide a means for automatically controlling the exciter differential field in accordance with the torque supplied by the internal combustion engine.

Further objects, not specifically enumerated above, will be apparent as the invention is described in greater detail in connection with the single figure of drawing, wherein is shown, diagrammatically, the connection of the exciter differential field to a resistance which is controlled by suitable relays which are in turn controlled by the speed of rotation of the internal combustion engine.

Referring to the above drawing, $a$ indicates a suitable shaft, for example, the timing shaft, which is driven directly from the internal combustion engine and upon which are mounted spaced switch discs $a'$ and $a^2$, respectively. The discs are formed of outer conducting disc sections $a^3$ and inner insulating disc segments $a^4$. Brushes $a^5$ engage the peripheries of disc elements $a^3$ on disc $a'$ and brushes $a^6$ engage the peripheries of disc elements $a^3$ on disc $a^2$.

Between the switch discs $a'$ and $a^2$ an inertia disc $b$ is mounted. This disc is pivoted at $b'$ upon shaft $a$ and is normally held in the position shown in the drawing by a spring $b^2$ which is connected between the disc $a^2$ and the lower portion of the disc $b$. Conducting segments $b^3$ are formed on the disc $b$ and contacts $a^7$, connected to the outer disc elements $a^3$ on the disc $a'$, are positioned to be engaged by one of the segments $b^3$ when the disc is in the position shown in the drawing. Contacts $a^8$ connected to the outer disc elements $a^3$ of the disc $a^2$, are positioned so that they will be engaged by the conducting segments $b^3$ when the disc is in a substantially vertical position.

For engine speeds up to 1400 revolutions per minute, the spring $b^2$ holds the disc in the position shown in the drawing. The tension of this spring is so adjusted that an engine speed of 1600 revolutions per minute causes the left hand conducting segment $b^3$ to engage the contacts $a^8$. Between these limits, the disc $b$ engages neither set of contacts. A current source $c$ is connected through wire $c'$ to the inner contacts $a^5$ and $a^6$. The outer contact $a^5$ is connected through wire $c^2$ to a relay $d$ and wire $c^3$ connects the other terminal of the relay to the current source $c$. The outer contact $a^6$ is connected through wire $c^4$ to a relay $e$, the other terminal of the relay being connected to wire $c^3$. It will thus be seen that relay $d$ is energized when contacts $a^7$ are engaged by the disc, while relay $e$ is energized when contacts $a^8$ are engaged by the system.

The contacts of relay $e$ are normally open while those of relay $d$ are normally closed, although for speeds below 1400 revolutions per minute, relay $d$ is energized to open its contacts. A resistance R is connected through wire $d'$ with one of the contacts of relay $d$ while, at the other end of the resistance, wire $e'$ connects it to one of the contacts of relay $e$. The other contacts of the relays $d$ and $e$ are connected to an intermediate point of the resistance R through a wire $f$, thus dividing the resistance R into resistance units $r'$ and $r^2$.

The main generator is shown at G, having a shunt field $g'$. An exciter E is connected to the generator shunt field through wires $g^2$ and provided with a shunt field $h$. The differential field of the exciter is shown at D and is connected in series with the generator and motor through wires $h'$. Resistance R is connected across the differential field D by means of wires $h^2$.

The operation of the device is as follows:

For engine speeds below 1400 revolutions per minute, contacts $a^7$ are closed and relay $d$ energized, thus cutting in resistance element $r^2$ and causing greater excitation of the differential fields, thereby weakening the exciter shunt fields and reducing the load. This reduction in excitation permits the engine speed to increase, thereby increasing the generator output in proportion to the engine H. P. increase, due to increased speed.

As the motor accelerates, it will require higher voltage and the engine speed will increase. The disc $b$ will move away from contacts $a^7$, deenergizing relay $d$ and thus closing its contacts and cutting out resistance $r^2$. This will weaken the differential fields, thereby increasing the exciter fields, thus tending normally to increase the generator load, this action being minimized by continued reduction of amperes caused by the motor acceleration.

As the engine accelerates, contacts $a^8$ will be closed, energizing contactor $e$ and cutting out resistance $r'$, thereby decreasing the excitation in the differential fields and allowing increased excitation in the exciter and main generator shunt fields, thus tending to prevent further increase of the engine speed due to the increase in generator load.

While the invention has been described with specific reference to the connections shown in the accompanying drawing, it is not to be limited, save as defined in the appended claims.

I claim as my invention:

1. In combination with an exciter differential field and a speed responsive switch, a resistance connected across the field, a normally open relay connected across a portion of the resistance, opposed contacts cooperating with the switch, means to urge the switch into engagement with one of the contacts, connections between one of the contacts and the relay, a second relay normally closed across a second portion of the resistance, and connections between the second relay and the other of the spaced contacts.

2. In combination with an exciter field and a speed responsive switch, a resistance connected across the field, relays connected across portions of the resistance, opposed contacts cooperating with the switch, means to urge the switch into engagement with one of the contacts, and connections between the contacts and relays.

3. In combination with a generator and an engine for driving the same, a generator field, a switch normally urged into engagement with one set of contacts, but actuated by a predetermined engine speed to engage a second set of contacts, a resistance across the field, relays across portions of the resistance, and means connecting the relays to the contacts to cut in the reistance when the switch engages the second contacts, to cut in one portion of the resistance when the switch engages neither set of contacts, and to cut out the resistance when the switch engages the first contacts.

4. In combination with a generator and an engine for driving the same, a generator field, a switch normally urged into engagement with one set of contacts, but actuated by a predetermined engine speed to engage a second set of contacts, a resistance across the field, relays across portions of the resistance, and means connecting the relays to the contacts to cut in the resistance when the switch engages the second contacts and to cut out the resistance when the switch engages the first contacts.

5. In combination with a generator and an engine for driving the same, a generator field, an engine speed responsive device, a resistance across the field, relays across portions of the resistance, and means controlled by the speed responsive device to operate the relays.

This specification signed this 7th day of June A. D. 1929.

WILLIAM B. JUPP.